Patented Apr. 12, 1949

2,466,773

UNITED STATES PATENT OFFICE 2,466,773

METHOD OF MELTING ICE

Paul Kestenbaum, Brooklyn, and Manassah Aussenberg, New York, N. Y.

No Drawing. Application December 19, 1946, Serial No. 717,324

6 Claims. (Cl. 252—70)

This invention relates to a composition for and to a method of melting ice.

We have discovered that ice may be very quickly melted by applying anhydrous aluminum chloride to the surface of the ice. Preferably the anhydrous aluminum chloride is applied in powder form, being sprinkled over the ice surface. The ice-melting action of anhydrous aluminum is very rapid and is due primarily to the heat generated when it is brought in contact with the ice. Other water-soluble anhydrous aluminum halides may be used in lieu of anhydrous aluminum chloride or any one or more of such other halides may be mixed with anhydrous aluminum chloride in equal or any other suitable proportions. Such other halides are anhydrous aluminum bromide and anhydrous aluminum iodide, but they have a slower ice-melting action than anhydrous aluminum chloride which is therefor preferred.

The ice-melting compound of the present invention may be applied on the icy surfaces of roads, to the icy surfaces of railroad tracks, switches, etc., for quickly removing ice therefrom, and said compound may of course be used generally for melting ice. When said compound is used on roadways, railroad tracks, etc., any suitable substance, for example sodium acetate may be applied, if desired, to the surface previously treated with said ice-melting compound, for the purpose of neutralizing free hydrochloric acid formed as a result of the application of said ice-melting compound to the ice.

Having thus described our invention, what we claim and desire to secure by Letters Patent is:

1. The method of melting ice which comprises applying to the surface thereof a water-soluble anhydrous aluminum halide.

2. The method of melting ice which comprises applying to the surface thereof anhydrous aluminum chloride.

3. The method of melting ice which comprises applying to the surface thereof anhydrous aluminum chloride in powdered form.

4. The method of melting ice which comprises applying to the surface thereof anhydrous aluminum bromide.

5. The method of melting ice which comprises applying to the surface thereof anhydrous aluminum iodide.

6. The method of melting ice which comprises applying to the surface thereof anhydrous aluminum chloride and a different water-soluble anhydrous aluminum halide mixed with said anhydrous aluminum chloride as essential ice-melting substances.

PAUL KESTENBAUM.
MANASSAH AUSSENBERG.

REFERENCES CITED

The following references are of record in the file of this patent:

UNITED STATES PATENTS

| Number | Name | Date |
|---|---|---|
| 1,787,887 | White et al. | Jan. 6, 1931 |
| 1,825,151 | Keoleian | Sept. 29, 1931 |
| 1,971,660 | Sander | Aug. 28, 1934 |
| 2,342,759 | Schechter et al. | Feb. 29, 1944 |